United States Patent [19]

Stanbury et al.

[11] Patent Number: 4,850,010
[45] Date of Patent: Jul. 18, 1989

[54] TELEMETRY TERMINAL

[75] Inventors: Evan J. Stanbury, Lakemba; Gregory D. Watkins, Coogee; Peter J. Naish, Epping; Graeme J. Bellis, Cronulla; Alan E. Hansford, Kings Langley, all of Australia

[73] Assignee: Alcatel N.V., Amsterdam, Netherlands

[21] Appl. No.: 107,797

[22] PCT Filed: Oct. 31, 1986

[86] PCT No.: PCT/AU86/00330
§ 371 Date: Sep. 25, 1987
§ 102(e) Date: Sep. 25, 1987

[87] PCT Pub. No.: WO87/03446
PCT Pub. Date: Jun. 4, 1987

[30] Foreign Application Priority Data

Nov. 25, 1985 [AU] Australia ............... PH3553
Mar. 20, 1986 [AU] Australia ............... PH5125
Apr. 10, 1986 [AU] Australia ............. 55,947/86

[51] Int. Cl.$^4$ ........................... H04M 11/00
[52] U.S. Cl. .................. 379/107; 379/102; 340/870.03; 340/505
[58] Field of Search ............ 379/102, 104, 105, 106, 379/107, 2, 26, 32, 33; 340/870.03, 505, 870.02, 825.54

[56] References Cited

U.S. PATENT DOCUMENTS 3,786,423 1/1974 Martell .
3,899,639 5/1973 Clevely et al. .
4,022,977 5/1977 Nomura .
4,254,472 3/1981 Juengel et al. .
4,370,723 1/1983 Huffman et al. .
4,388,690 6/1983 Lumsden .
4,509,128 4/1985 Coppola et al. .
4,549,274 10/1985 Lerner et al. .
4,568,934 2/1986 Allgood .

FOREIGN PATENT DOCUMENTS 0015120 2/1980 European Pat. Off. .
0101788 8/1983 European Pat. Off. .
150524 of 0000 New Zealand .
WO85/01852 of 0000 PCT Int'l Appl. .

OTHER PUBLICATIONS

Au, B, 49593/72 (473891), Standard Telephones & Cables, Jun. 6, 1974.
UK Patent App. 2053641A, Jun. 18, 1980, F. A. Mendoza, "Data Transmission System".
Australia Pat. Appl. #49,288/85, F. Hargrove, "Telemetry System".
PCT WO85/01852, Apr. 25, 1985, "Centerpoint Automatic Meter Reading System", International Teldata II Corporation.

Primary Examiner—Jin F. Ng
Assistant Examiner—Wing Fu Ghan
Attorney, Agent, or Firm—Spencer & Frank

[57] ABSTRACT

A telemetry terminal for controlling and metering consumption of electricity, water, etc., at a consumer's premises having a programmable processor. The programmable processor includes a receiver to receive instructions over the phone line to operate switching controls and a transmitter to transmit readings stored in the processor from meters to a central control station over the phone line. The processor also has a switching control routine in the event of an interruption to the phone line.

15 Claims, 3 Drawing Sheets

TELEMETRY TERMINAL

TECHNICAL FIELD

This invention relates to remote monitoring or control of loads and will be described in terms of the control or monitoring of the users of an electricity utility but it may also be used in respect of other utilities such as gas and water.

BACKGROUND ACT

In an electricity supply grid it is known to switch off-peak hot water systems by "tone" signals transmitted by the utility over the supply lines. This requires the injection of large currents into the power grid at frequencies of about 400 Hz. In a known electronic meter reading system meters electronically store readings at the consumer's premises and the meter reader connects a portable meter reading device to the electronic meter and the reading is transferred to the portable device.

SUMMARY OF THE INVENTION

The system described herein makes it possible for the utility to transmit control signals over the telephone lines to the user's equipment to perform the switching operation. Alternatively the switching may be controlled by an electronic clock at the subscribers premises and the switching times may be varied by signals transmitted over the telephone line. Other embodiments disclose techniques for remotely reading the meter at the user's premises. Our provisional application No. PH 3553 (P. Naish 1) discloses a method of off-peak switching over the telephone line which has a back-up "clock" at the user's premises in case of failure of the telephone line. A further embodiment makes possible load shedding on a selective basis where an indication from a sub-station to the utility's control system shows that the load on the sub-station has reached a maximum permissable level.

Another embodiment allows load shedding at an individual user's premises where the user's load exceeds a maximum permissable. This system may allow short term loads in excess of the maximum. A maximum permissable load per consumer may be stored in a memory and load shed when this load is exceeded for a specified time.

A further embodiment which may be applicable e.g. where the tariff changes when use over a period exceeds a preset total e.g. excess water rate would enable the system to compare cumulative use with the average permitted use and to give an indication to the user when actual use exceeded the permissible average. During periods of water restrictions outside taps, routed through a remotely controllable valve, can be shut off for specified periods.

Accordingly intelligent units, referred to as utility management terminals (UMT) are installed at the user's premises and these are capable of reading meters and switching loads.

BEST MODE OF CARRYING OUT THE INVENTION

Figure 1:
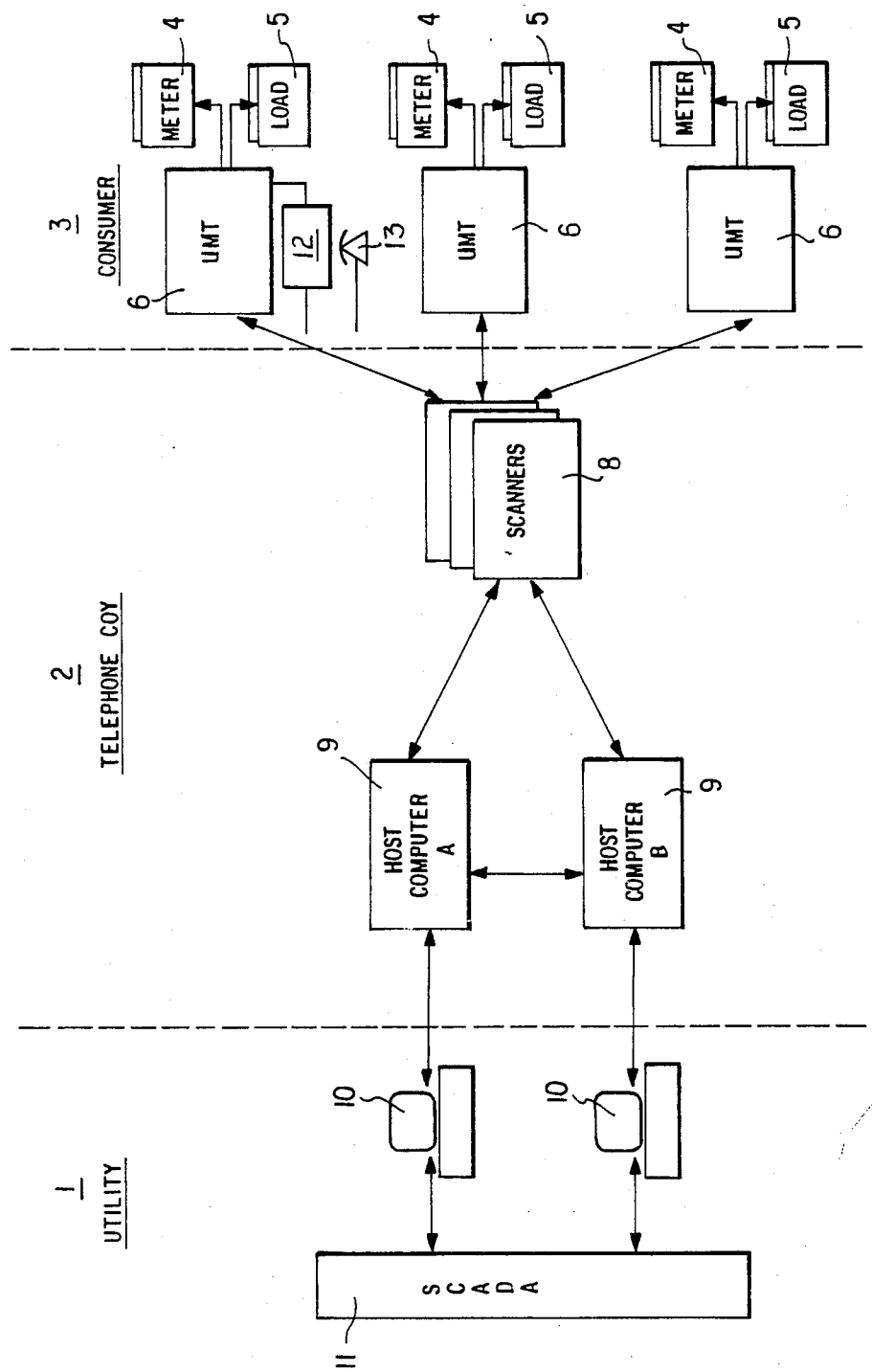
FIG. 1 shows a block diagram of a system embodying the invention.

FIG. 1 shows the main elements of the system. In the first area 1 is the equipment at the utility's central control, while area 2 shows the equipment installed at the telephone exchange and area 3 shows the equipment at the consumer's premises.

At each consumer's premises there may be installed meter reading equipment 4 or load control equipment 5 or both. There may be more than one of each device for each consumer.

The subscriber is allocated an utility management terminal (UMT) 6 which is connected to the telephone line 7 in parallel with the telephone.

At the telephone exchange the line 7 is connected to a scanner 8 which is capable of monitoring about 2000 such lines. This connexion is made on the subscriber line and no exchange switching equipment need be involved. The scanners act to concentrate the information and pass it to the host computer 9, shown with backup units A and B. The UMTs are linked through the host computer to the Central Control 10. This Computer 9 acts as a special purpose message switch which routes messages to the UMT's and checks acknowledgement. Should a UMT fail to acknowledge a message or should there be a failure affecting the system, a report is sent to the Central Control Terminal 10.

Some of the features which may be provided by the system are set out below.

The status of the UMT is available at the Central Control Equipment by an interrogation/response sequence and there may be an on-site status indicator. Should power be removed from the UMT for up to 60 seconds then, when power is restored the UMT will return the load to the state it was in before the interruption. A capacitor or battery may be used to sustain the status. Should power be removed from the UMT for more than 60 seconds then, when power is restored the UMT may be programmed to ensure that the load is switched off. Restoration to the previous state will be initiated by a command from the Central Control Equipment. Should a UMT be installed in an area where Telecom circuits are not yet available then it will be possible to set the time of day in that UMT. The UMT will then operate as a time clock and will turn the load on and off at pre-programmed times. Should a UMT lose communications with the the Scanner to which it is connected that UMT may be programmed so it will operate as a time clock. A UMT is individually addressable and is able to be switched on or off at any time from the Central Control Equipment. A UMT can be allocated to any operating group from the central control site. On-site access will not be necessary to change any UMT's group. The group to which a UMT has been allocated is known at the Central Control site. Loss of communications with a UMT is reported to the Central Control site.

The Central Control Equipment in area 1 has some or all of the following capabilities.

Control of the customer loads connected to the network. Load management to control UMT groups in a specified order of priority. System load data from the SCADA (Supervisory Control Automatic Data Acquisition) system is used as the control input. The objective here is for the integral of load over a fifteen minute period to approximate a straight line from 0 to the maximum load for that period. The Control Equipment can turn on or off an individual UMT load with a single command. The Control Equipment has the ability to turn on or off all UMT loads in a particular group with a single command and turn on or off all UMT loads with a different command. The Control Equipment may execute an entered programme to periodically turn groups on or off. There may be different programmes for holidays and weekdays. It is possible to manually override the programme. Password protection may be used to prevent access to sensitive parts of the Central Control Equipment software. It provides the ability to read accumulated meter pulses from the UMT. All system error messages may be logged on a printer with a time and date stamp. These messages will include reports of any UMT failures as well as any communications problems.

Should there be a loss of communications to the UMT or should a telephone circuit be unavailable for a particular consumer when a UMT is installed then the UMT will revert to an automatic fallback state. This is referred to as the Preset Automatic Operating Facility (PAOF) feature and will allow load control to be maintained through any temporary interruption to the network.

PAOF functions will come into operation if communications are disrupted for more than a predetermined period such as 1 hours.

The functions that are available are described below:

The UMT will switch the connected load ON and OFF at preset times. These times may be set in all of the following ways:

In the factory before delivery.
By the Authority before installation.
By the Authority at the time of installation or
By the Authority after installation.

The UMT may be supplied with one preset ON time and one preset OFF time. These times can be programmed to meet the Authority's requirements and are contained in the UMT EPROM.

The Authority will be able to produce UMT EPROMs with alternative switching times, using a master EPROM and may set up the required switching times using an EPROM programmer. These EPROMs may be inserted in UMTs prior to installation or, should it be necessary they may be installed on site at any time. The program may be altered by a message transmitted over the telephone line.

In addition, it is possible to change the default time at which the UMT switches, by making on site adjustments without changes to the EPROM.

The time of day is programmed into an internal clock in each UMT when it is installed. This is done by means of switches that are accessible when the cover of the UMT is removed, or by instruction over the phone line.

The clock may be set, in increments of 30 minutes, to any time between 8 a.m. and 4 p.m. This time is maintained by a high precision crystal.

The Optical PAOF Functions provide significant enhancements to the PAOF mode of UMT operation. The switching times may be programmed into a UMT from the Central Control site provided that both power and communications to an operating UMT are available. The UMT can store previous ON and OFF switching times. This enables a UMT to continue operating as it did previously. The UMT can maintain a time reference during extended power failure so that operation will recommence with the current time of day after an extended loss of mains power. This capability can extend to cover loss of power for several days.

The system may be configured to operate in either a digital or analog network.

Figure 2:
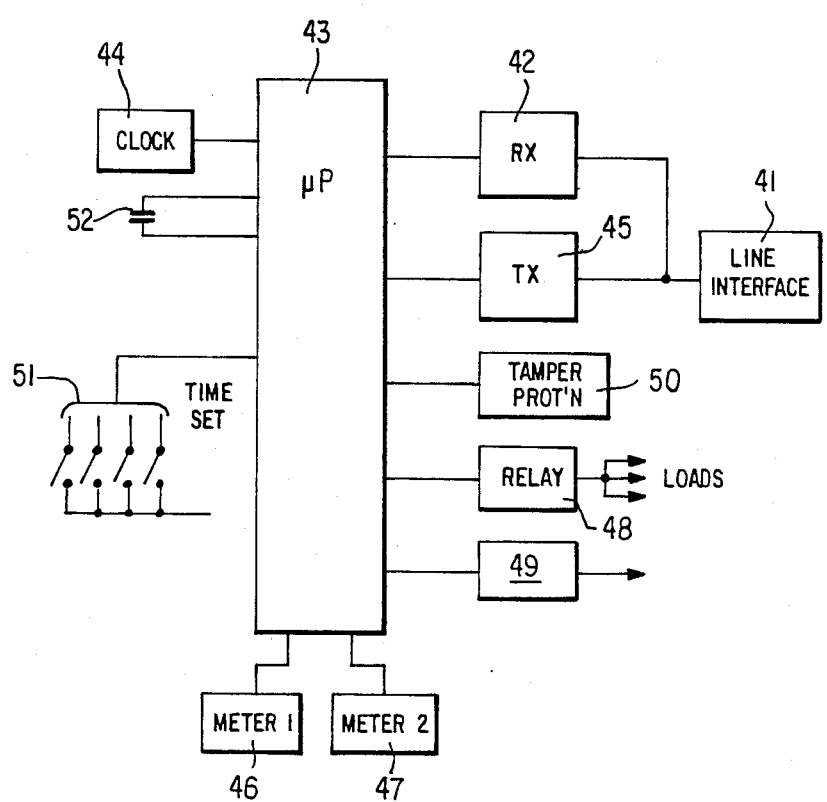
FIG. 2 is a block diagram of a UMT.
Figure 3:
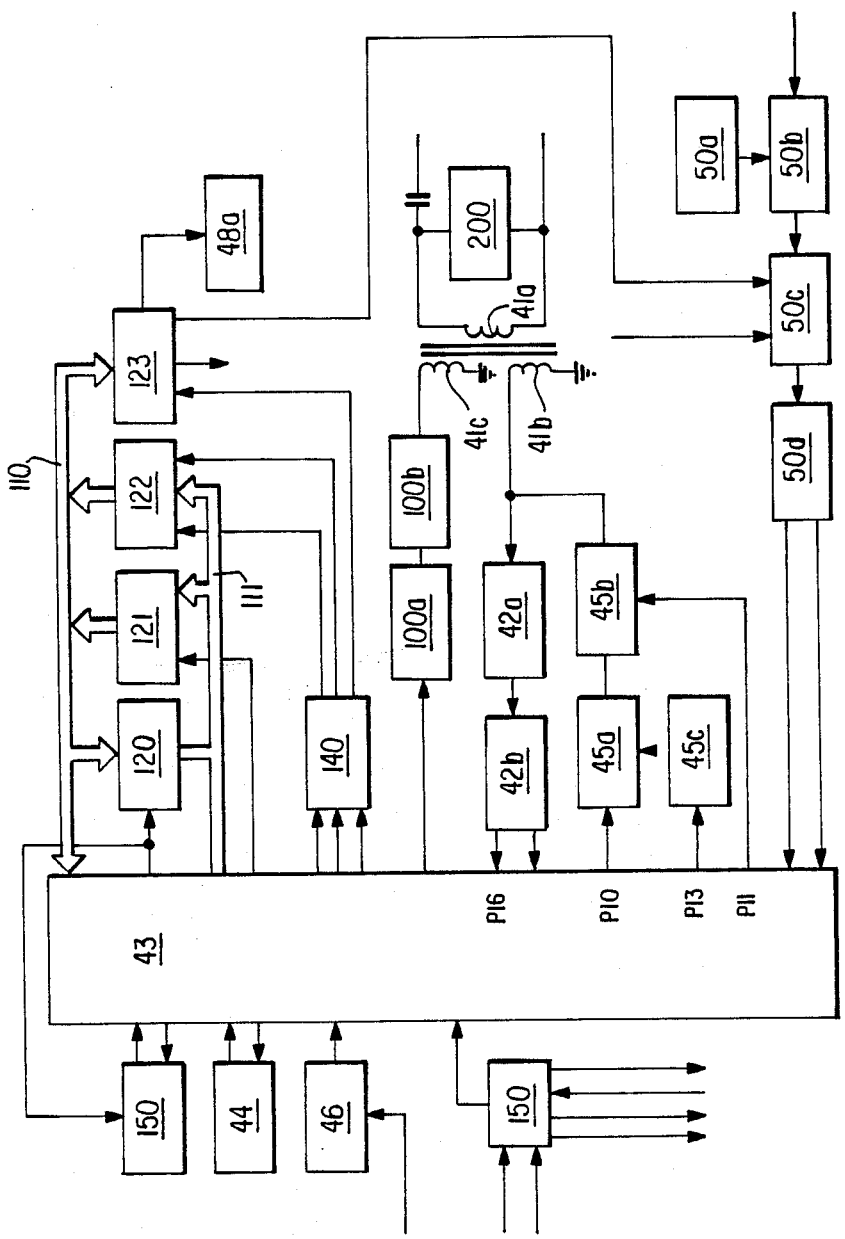
FIG. 3 shows a more detailed embodiment of the UMT of FIG. 2.

In FIG. 2 and FIG. 3 embodiments of an UMT are shown in block form.

When a message is received by the UMT, it is fed into the processor 43 which recognizes the message as a request for meter reading, instruction to switch loads, routine tests etc. and is programmed to respond appropriately.

The line interface 41 may serve the purpose of coupling signals to the phone line while isolating the UMT power supply from the line. It may comprise e.g. an opto-coupler or a line transformer.

The receiving circuit 42 detects the presence of a Utility Management System UMS message on the phone line and passes the message to the microprocessor 43. The receiver 42 is able to recognise a UMS code and prepare the signal for the processor. If the signal is digital the receiver may perform pulse shaping functions while if the signal is analog the receiver may convert it to a suitable digital format. In a present embodiment the signal is an FSK signal which the receiver converts to a digital signal.

The message is stored in a command buffer in processor 43, checked for validity and actioned.

The message may be one which causes the microprocessor 43 to operate a relay such as 48 or 49 or latch 48a of FIG. 3 or to transmit a meter reading from meters 46 or 47 stored in the processor memory or in NOVRAM 122 of FIG. 3 via the transmit circuit 45 over the phone line to the scanner 8 at the telephone exchange 2 (See FIG. 1) where the information is processed by host computer 9 and relayed to the utility's central control in area 1. The transmitter 45 may be digital or analog depending on the network. In one embodiment involving an analog network the microprocessor 43 may generate digital signal which the transmitter converts to a suitable analog format, e.g. FSK. In a further embodiment the processor 43 may generate the analog signal which the transmitter 45 amplifies for transmission. Transmitter 45 and receiver 42 may be incorporated into a single IC modem. Supervisory tone may be applied to line via tone generator ciruitry 100a, 100b.

For a digital network the processor generates a digital signal and the transmitter then becomes a digital line interface and may perform such functions as equalization.

A system of acknowledgement messages (handshakes) may be used to confirm receipt of messages at either end. This may be particularly important where the telephone is being used by the subscriber at the time a series of messages is being interchanged. The system may operate by transmitting bursts during conversation and this leaves the messages open to corruption by the speech signals. In this arrangement, therefore, it is necessary to transmit signals which confirm the successful receipt of a message. In the absence of such an acknowledgement the sender repeats the message. When the Central Control Equipment does not receive an acknowledgement, it will repeat the message a predetermined number of times or until acknowledged, and report a fault if unsuccessful. The data transmission can be carried out by any of several known techniques such as frequency shift keying (FSK), dual tone multi-frequency (DTMF), or a pulsing technique. Such signalling can be designed to have a minimal effect on a simultaneous voice message, being heard as background "chips". The effect of a voice message or the lifting of the handset on the data is minimised by the use of the "handshakes" and repetition of corrupted data when it is not acknowledged from the other end."

Also shown connected to the microprocessor is a clock 44 and a bank of switches 51. The switches can be used to set the time of day to operate the local clock.

Tamper protection in the form, e.g. of one or more switches which are operated for instance when the cover is opened, are provided at 50.

A large capacitor 52 may also be included to preserve the contents of the processors memory should there be a loss of power to the UMT. Using this capacitor the UMT can store the meter reading or pulse signal from the meter so the data is not lost. In another embodiment meter readings are stored in non-volatile RAM to provide a permanent record of the reading at the time of failure.

The UMT includes a clock oscillator 44 which maintains a time of day clock in the microprocessor logic so that, in the event of an interruption to the telephone line detected by line fault detector means 12, functions such as off-peak switching can be maintained.

The system offers the Authority the ability to control peak load conditions with more precision than was previously possible and the greater predictability of the peak is of great value to electricity generating authorities. Where the utility has installed a Supervisory Control Automatic Data Acquisition system (SCADA), it has information showing the load trend. It is thus possible to predict reasonably accurately when the load will approach a permitted maximum. Using this information it is possible to begin a load shedding program to avoid exceeding the permitted level. With a program incorporating a suitable hysteresis factor the load can be maintained below this level.

FIG. 3 is a more detailed functional diagram of an embodiment. The phone line connects to interface 41a, 41b and 41c, and is bridged by protection circuitry 200. Incoming messages from the phone line are detected by 42a which would be an FSK input filter in the case of an FSK signalling system. Filter 42a feeds into demodulator 42b which transmits the demodulated signals to P16.

The incoming message may be:
(a) a switching command
(b) a meter interrogation
(c) a reprogramming command
(d) a routine test In FIG. 3 address latch 120 and memories 121 and 122 are used to conserve space in the microprocessor 43.

In the case of a switching command the microprocessor 43 routes the command over data bus 110 to output latch 123 which initiates the switching operation and then causes an acknowledgement signal to be transmitted via terminal 10 to line. In the case of an FSK system this signal would be sent via FSK Buffer/Filter 45a, controlled by output energy level switch 45c, to FSK output switch 45b and to line through interface 41.

In the case of a meter interrogation, either an absolute readout meter or a pulse generating meter may be used. Where the pulse meter is used a cumulative count is stored in the microprocessor or an associated memory. In the case of an absolute meter readout, the reading may be taken directly from the meter.

The meter interrogation command causes the meter reading or the cumulative count to be fed to the line again via P10.

Read/Write decode circuitry 140 can be used to modify the microprocessor data by altering NOVRAM 122. This may be used, for example, to update the load switching time, or alter other program features.

Routine tests may be used to test the operation of the subscriber terminal unit. Such tests may comprise a memory test, check of transmit and receive circuitry or functional tests such as a brief operation of the load relays and receipt of an acknowledgement signal. Other functions may similarly be monitored.

Other commands which may be implemented include: Enable load survey; this causes the UMT to transmit data on one or more meters to the central control equipment at fixed intervals of e.g. 15 minutes to allow load surveys to be made. A survey cancel command causes the survey to be discontinued.

Maximum Demand Interrogation; the UMT stores the maximum energy consumed during a fixed period (15 minutes) in a register and the time of day when this occurred, and this is transmitted by the UMT on interrogation. A further command resets the register. Set load groups; defines which group commands will affect the UMT loads.

The UMT also allows the meter readings to be charged at different rates during the day. This is achieved by having a number of registers each to store pulses generated during specific hours during the day. In this way peak usage period pulses are stored in one register and low usage period pulses are stored in another register and there may be one or more intermediate registers. The time of day clock in the UMT is used to switch the meter pulses into the various registers depending on the time the pulses are generated. When the meters are read the meter register readings are read out over transmitter 45 in turn and the appropriate tariff rates applied to the various readings at the central control equipment when accounts are prepared.

Additional registers may be provided to allow differentiation between week day and weekend or holiday consumption.

Where there are a plurality of meters attached they may be read in sequence so their readings are applied to the appropriate registers by microprocessor 43. The meter outputs may be sampled at a higher rate than the maximum rate at which pulses are generated in the meter to allow for redundancy verification, e.g. a pulse not being recognized unless it is present on two successive samples.

The UMT can be reprogrammed from the Central Control Equipment by transmitting a reprogramming message over the telephone line. The message is decoded stored in the microprocessor command buffer, verified and then applied to e.g. NORAM 122 over line 111 to rewrite the protions of the program it is desired to alter. For instance it may be desired to amend the time-of-day tariff scales when daylight saving is introduced or removed, or otherwise make allowance for seasonal peaks.

INDUSTRIAL APPLICABILITY

The invention discloses equipment for remotely reading meters and controlling loads connected to utility supplies such as electricity, water and gas. The information and instructions are transferred between the subscriber's premises and a central control via the telephone network.

We claim:

1. A utility management terminal for providing information and control in relation to a consumer's demand on an utility supply, the terminal comprising processor means, transmitter means connected to the consumer's telephone line to transmit information to the telephone line, the terminal has one or more metering means each adapted to produce a meter signal indicative of the consumption measured by its respective meter, storage means to store the meter signals, transponder means responsive to a first command signal received over the telephone line to cause one or more of the meter signals stored in the storage means to be transmitted to the telephone line, one or more utility control devices controlled by utility control logic means included in the processor means to execute a load shedding routine to switch ON or OFF as appropriate all or at least one of the utility control devices either in response to a second command signal received over the telephone line or under control of a time of day program stored in the processor means, wherein the processor means includes electronic clock means and is arranged to execute the time of day program to control the utility control devices in response to the detection of a failure of the telephone line or where the terminal is not connected to a phone line.

2. A utility management terminal comprising processor means, transmitter means connected to a consumer's telephone line to transmit information and wherein the processor is arranged to execute a time of day program to control utility control devices in response to a detection of a failure of the telephone line by line fault detector means or where the terminal is not connected to a phone line.

3. A utility management terminal as claimed in claim 1, wherein the transponder means includes acknowledgment signal means to transmit an acknowledgment signal to the telephone line when a signal is received over the telephone line.

4. A utility management terminal as claimed in claim 1, wherein the terminal is connected to the telephone line in parallel with the consumer's telephone.

5. A utility management terminal as claimed in claim 1, wherein the transponder means includes receiver means connected to a consumer's telephone line to receive control signals transmitted over the telephone line, the utility control logic means responsive to the receiver means output to control utility devices of one or more utility supplies or part thereof at the consumer's premises.

6. A utility management terminal as claimed in claim 1 and including a local power supply or store capable of maintaining clock and logic operation in the event of a failure of the telephone line.

7. A utility management terminal as claimed in claim 1, wherein the processor means comprises a microprocessor and wherein the storage means are part of, or controlled by the microprocessor, the microprocessor being programmed to execute instructions received via the receiver means.

8. A utility management terminal as claimed in claim 7, wherein the microprocessor programming can be stored in the microprocessor, auxiliary storage means as well as stored in both the microprocessor and the auxiliary storage means, and wherein means are provided to alter the programming in response to signals received via the receiver means.

9. A utility management terminal as claimed in claim 1, wherein the storage means comprises, for recording the reading of the metering means, two or more storage registers and wherein logic means are provided to direct the meter signals to which ever of the storage registers is selected by a register selection signal produced by a register selection signal generator.

10. A utility management terminal as claimed in claim 9, wherein the register selection signal generator comprises a programmable time-of-day clock which generates the register selection signals in accordance with a selected program.

11. A utility management terminal as claimed in claim 1, including means responsive to a telephone line fault and wherein the utility control logic means is responsive to a line fault detector means to initiate the load shedding routine under the control of the time of day program in response to detection of a line fault by the line fault detector means.

12. A utility management system comprising central processing means arranged to transmit control signals to and receive information from a plurality of utility management terminals each as defined in claim 1.

13. A system as claimed in claim 12 including concentrator means interposed between the central processing means and the utility management terminals.

14. A system as claimed in claim 12 including utility demand metering equipment transmitting information on the consumer's on the utility supply to the central processing means and wherein the central processing means is programmed to transmit load shedding commands to one or more utility management terminals when the demand exceeds a first threshold, and to transmit a load restoring command to one or more of the utility management terminals which has been shed when the demand is below a second threshold.

15. A system as claimed in claim 14, wherein loads are shed on a cyclic basis between groups of consumers.

* * * * *